Oct. 19, 1965
C. JENSEN
3,212,201
QUESTION AND ANSWER GAME FOR THE SCHOOL AND HOME
Filed June 28, 1963
5 Sheets-Sheet 1
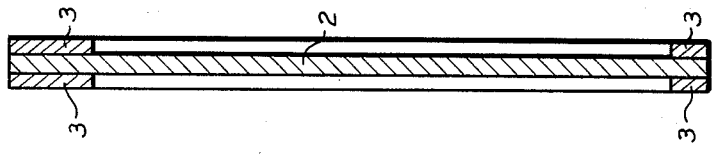
INVENTOR
CORNELIUS JENSEN
BY
ATTORNEY.

Oct. 19, 1965     C. JENSEN     3,212,201
QUESTION AND ANSWER GAME FOR THE SCHOOL AND HOME
Filed June 28, 1963     5 Sheets-Sheet 2

FIG. 6.

| 5·10-4 | 6·8 | 6·9 | 7·8 | 6·10-2 | 7·9 | 7·10-1 | 8·9 | 9·10-10 | 8·10+2 |
|---|---|---|---|---|---|---|---|---|---|
| 4·9 | 28+9 | 41-3 | 44-5 | 48-8 | 37+4 | 6·7 | 4·10+3 | 5·8+4 | 5·9 |

| 2·8 | 3·8-7 | 3·6 | 27-8 | 4·5 | 3·7 | 3·10-8 | 16+7 | 4·6 | 34-9 |
|---|---|---|---|---|---|---|---|---|---|
| 2·3 | 2·6-5 | 2·4 | 15-6 | 2·5 | 3+8 | 3·4 | 2·10-7 | 2·7 | 3·5 |

FIG. 5.

| 46 | 48 | 54 | 56 | 58 | 63 | 69 | 72 | 80 | 82 |
|---|---|---|---|---|---|---|---|---|---|
| 36 | 37 | 38 | 39 | 40 | 41 | 42 | 43 | 44 | 45 |

| 16 | 17 | 18 | 19 | 20 | 21 | 22 | 23 | 24 | 25 |
|---|---|---|---|---|---|---|---|---|---|
| 6 | 7 | 8 | 9 | 10 | 11 | 12 | 13 | 14 | 15 |

INVENTOR
CORNELIUS JENSEN
BY
ATTORNEY.

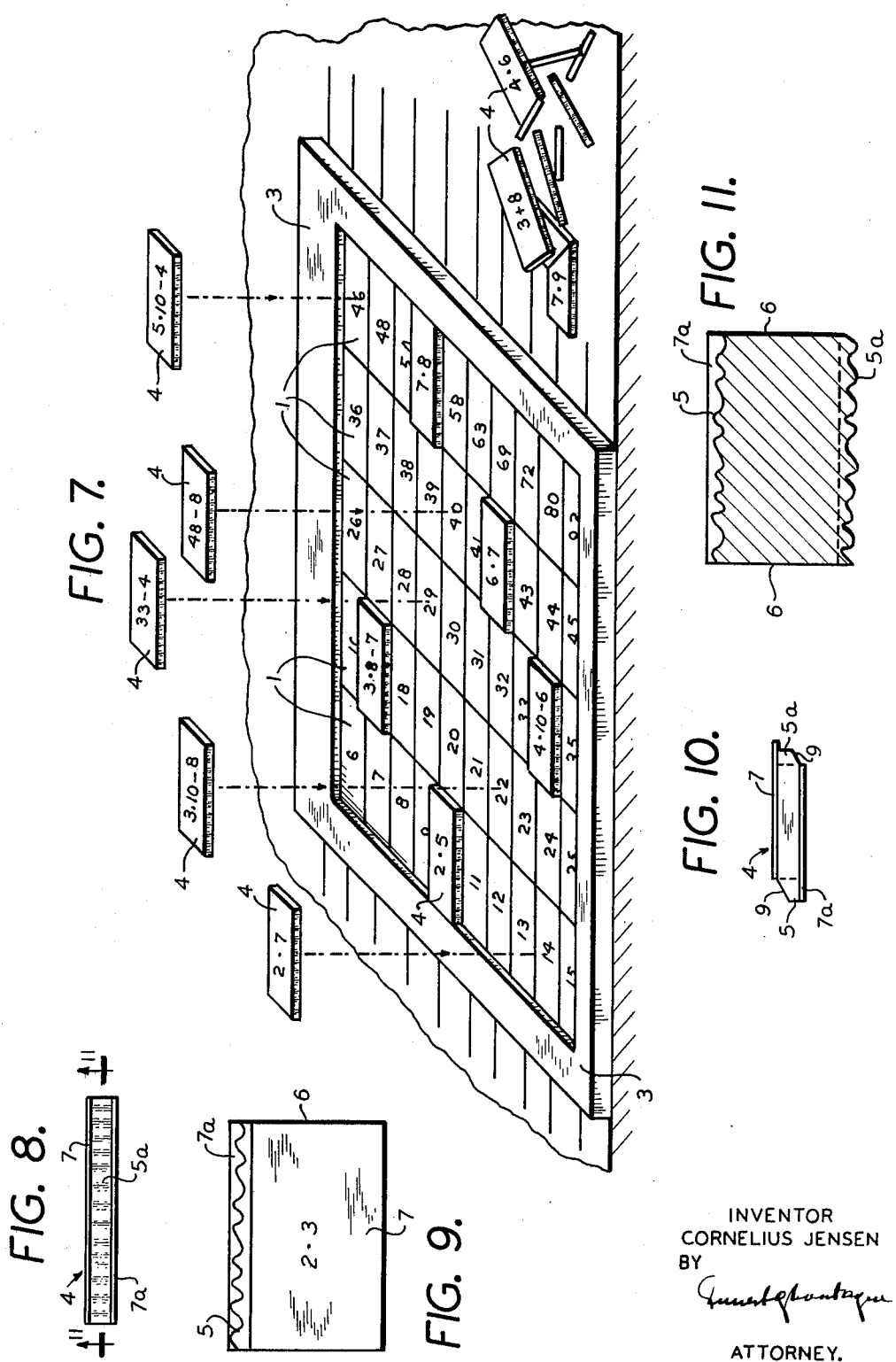

Oct. 19, 1965 C. JENSEN 3,212,201
QUESTION AND ANSWER GAME FOR THE SCHOOL AND HOME
Filed June 28, 1963 5 Sheets-Sheet 4
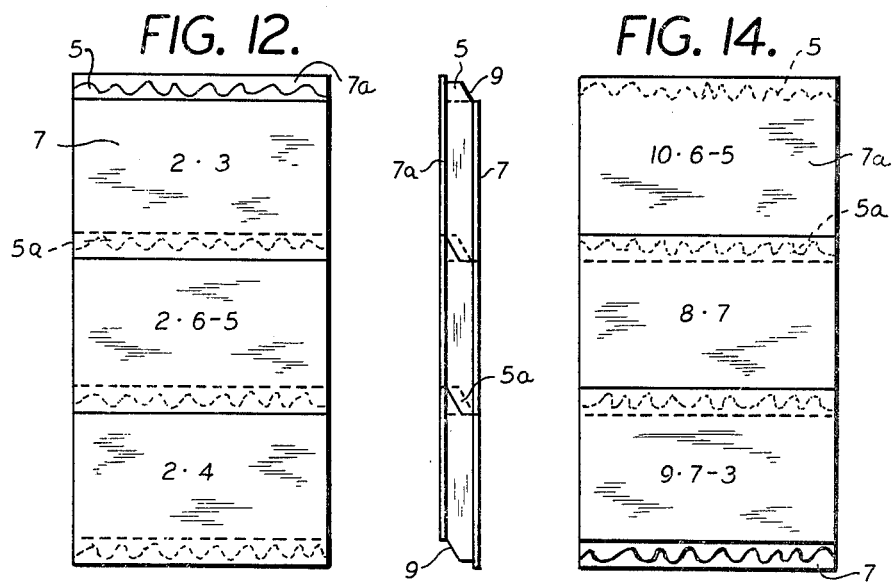
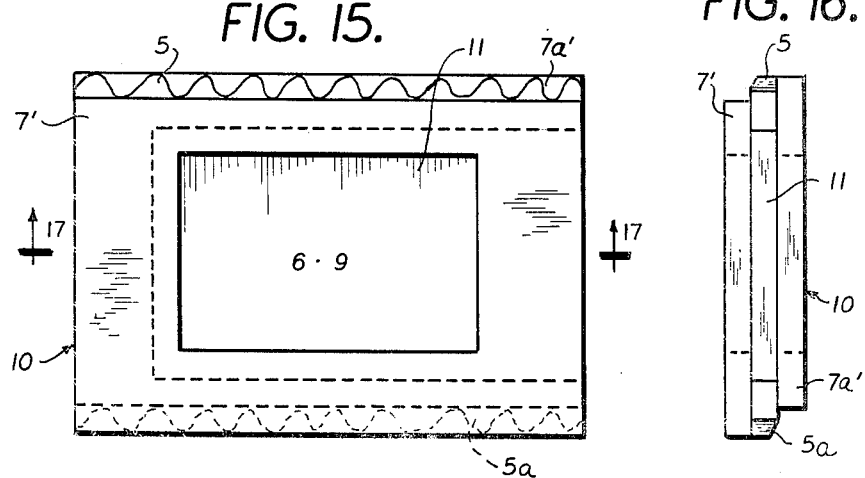
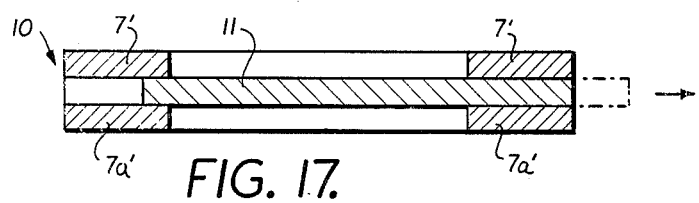
INVENTOR
CORNELIUS JENSEN
BY
ATTORNEY.

Oct. 19, 1965   C. JENSEN   3,212,201
QUESTION AND ANSWER GAME FOR THE SCHOOL AND HOME
Filed June 28, 1963   5 Sheets-Sheet 5
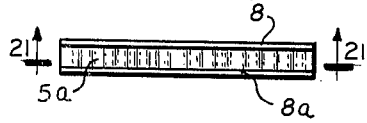
FIG. 18.
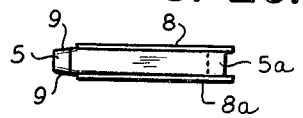
FIG. 20.
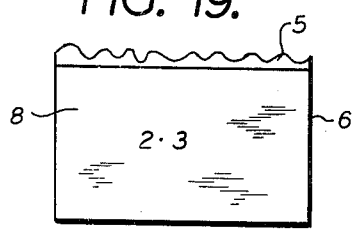
FIG. 19.
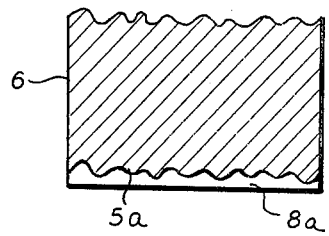
FIG. 21.
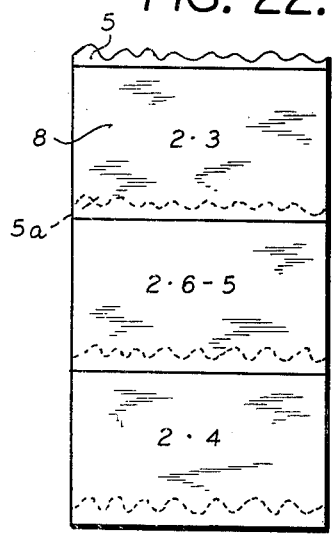
FIG. 22.
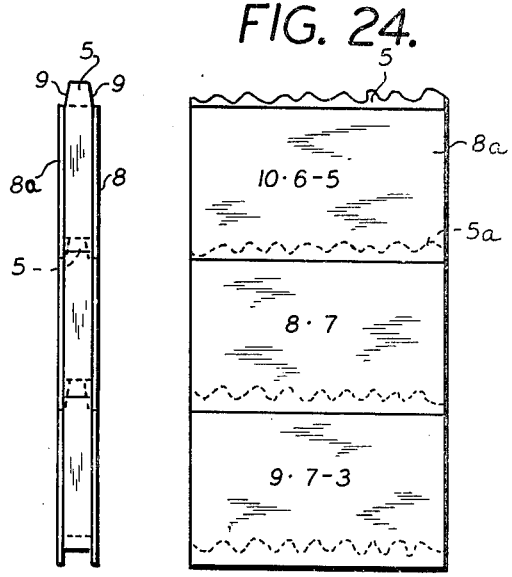
FIG. 24.
FIG. 23.
INVENTOR
CORNELIUS JENSEN
BY
ATTORNEY.

United States Patent Office 3,212,201
Patented Oct. 19, 1965

3,212,201
QUESTION AND ANSWER GAME FOR THE SCHOOL AND HOME
Cornelius Jensen, 2251 Sollwitt uber Husum, Germany
Filed June 28, 1963, Ser. No. 291,524
Claims priority, application Germany, June 30, 1962, J 22,029
10 Claims. (Cl. 35—31)

The present invention relates to a question and answer game for the school and home, and in particular to an ingenious silent occupation for the hand of school children of all grades.

A puzzle game is known, which has a base divided into marked fields and a plurality of cards coordinated to the fields and to be deposited on the fields, which cards carry on one side parts of a design and which complement each other upon correct setting to a combined image or design, whereby each back side of the cards is a carrier of a design, while each front side of the cards carries a problem or question. This puzzle game has the drawback that the combined working means has to be turned for its control. If all questions have been answered correctly, the back side carries a continuous and combined image, picture or design. If, however, the design does not appear correctly, because several solutions have been wrong, then it is necessary to turn back and forwards in a complicated manner. The teacher must check each individual control design, which requires an appreciable time period. Furthermore, only one side of the "question card" is equipped with a problem, while the other side serves the purpose of control, so that only a half result is brought about.

A game apparatus is also known, which comprises a game board and a plurality of game blocks marked on both sides and settable on the board, in which the game blocks are settable in accordance with the markings appearing on the front side thereof on coordinated fields of the game board such, that after its complete turnover and removal from the game board a control pattern having recesses is settable on the back side of the game board. As a suitable embodiment, these markings can be coordinated relative to each other on the front side and back side of each game block, whereby the back side has a multiple marking in series formed and is equippd with perforations corresponding with the perforations of the control pattern. This game apparatus has the drawback that the material required therefor is rather great. Thus, for instance, a cover plate, different control patterns, many problem compositions and many setting directions which are set up in a book, are required. This necessitates that the student has to pay attention to four different sources during the solution of each problem, namely the question board, the problem composition, the setting direction and the answer table. The effect for the child is very great and its attention is dispersed. By this arrangement, too much idle work is required. When the last question table is set on the answer board, the following working steps are required for the control of the correctness of the solution:

Setting of the cover plate, turning over of the answer table with the twenty-four question boards and of the cover plate, lifting of the answer table, lifting of the answer insert, correct and exact mounting of the control pattern on the question boards, control whether in the perforations of the control patterns no numbers or colors have appeared. The teacher is required, thereby, to move from table to table and to check each time twenty-four perforations in the individual control patterns, in order to determine whether the student has correctly solved all twenty-four problems. Incorrect solutions can be corrected only with great difficulties. It is required to remove the wrongly set boards and then to reverse the answer board with the correctly set question boards into the original position. Since, however, a part of the plates is missing, the remaining plates have no more support and move relative to each other, so that it is required to start all over again.

An occupational game is also known, in which a base plate and the small plates disposed thereupon are equipped with protuberances, raised portions or the like and holes, slots, etc., respectively, such that the small plates fit the base plate in a covering manner and, thereby, can be applied to a predetermined part face of the base plate only. This occupational game is also equipped with problems on one side only, while the other side serves the purpose of securing on the base plate and simultaneously of control.

In a further educational device or game, fields bearing solutions for arithmetic problems are disposed on the base, and in the upper part of the fields are any markings, which can be covered by a flap. A comparison and a self-control, respectively, is possible only if the markings are freed by the flap. Here the drawback resides in the fact that, for the control of the correctness of the solutions, first all markings must be freed by flaps and only then a comparison or control can be obtained.

An educational game with an automatic control and exchangeable problems has also been proposed, in which the solution card is inserted into the framed ground plate. It is equipped at the corresponding places with punched holes, through which the pins of the control device project. Here the drawback exists, that for each working means a perforated solution card is required. Furthermore, due to the insertion of the solution card, an additional working step is necessary. Finally, also the question plates are equipped with this working means with problems on one side only.

Furthermore, a puzzle game with a working frame in a window-like arrangement for insertion of answer ledges and laying cards is known. In this arrangement, answer strips and problem cards are disposed on a transparent layer. A cover, which is adapted to cover up after its proper insertion, permits the turning of the frame. Abstract lines, geographical cards, images, sayings, and the like appear on the backside as control means. By such arrangements the control and false solutions can be read and controlled. This puzzle game has the drawback that only a one-sided writing of the question card and thus also only half of the possible effect is made possible. Furthermore, the answer strips can be set wrongly. Nevertheless, the arrangements complement each other. In case of false solutions, however, a complicated back and forth turning results. Furthermore, the teacher has to perform each control of the correct line guide exactly and in a complicated manner. He has to go to each student and for this reason the control is rather time consuming.

It is, therefore, one object of the present invention to provide a question and answer game for the school and the house, which comprises a base divided into marked fields and a plurality of plates marked on both sides, coordinated to the fields and to be deposited on the latter, which plates, upon correct solution, are put together to a single unit.

It is another object of the present invention to provide a question and answer game which avoids the previously mentioned drawbacks.

It is still another object of the present invention to provide a question and answer game, wherein each problem plate to be deposited has though individual profiles which are different from the remaining used problem plates, yet have only insignificantly distinguishing profiles, whereby only the profiles and counter-profiles of two problem plates which abut each other correspond in case of a correct solution and engage each other along their entire length and always the profiles are visible only on one side. Furthermore, each problem plate to be set is useable for working purposes on both sides and carries problems.

Preferably, the problem plates have two sides disposed parallel relative to each other and two sides arranged with different curves. Since all problem plates are of different shape, none has the same configuration as the others.

The curved sides are arranged suitably with different, but similar curves. The wave heights and the wave lengths distinguish over each other only insignificantly.

Preferably, the longitudinal sides of the problem plates have a tooth-like profile. The number of teeth of one tooth row is constant for all problem plates. The form of the first tooth is identical in each upper tooth row in all problem plates. Likewise, the last tooth of each upper tooth row is equal in all problem plates. The teeth disposed between the first and the last tooth of each problem plate are different in all problem plates and fit always only in case of a correctly set problem plate into the recesses of a correctly set adjacent problem plate. Thus, on one longitudinal side of a problem plate at least eight teeth can be provided.

Suitably, the profiles on one longitudinal side are covered by cover plates and are slightly inclined on those sides where they are exposed. They lend themselves to be inserted easier into the counter-profiles below the cover plate. The cover plates can be set off on the upper and lower sides of the problem plate. They can, however, also cover one of the two profiles on the upper, as well as on the lower side of a problem plate.

In order to permit a change, without difficulty, in the writing of a problem plate, one problem plate can comprise a change frame open on both sides, which change frame has tooth-like profiles on both longitudinal sides, which are visible on one single longitudinal side only and which comprise an insertable plate written on on both sides.

It is also another object of the present invention to provide a question and answer game, in which the base serving as an answer plate is useable and is written on on both sides for working purposes.

Suitably, the answer plate equipped on both sides with written fields, has on both sides a surrounding play-free frame.

The game, designed in accordance with the present invention, can be of wood, of a hard fibre plate, of synthetic material, or the like. The two sides of the answer plate can be equipped with a predetermined color, for instance, green, on one side and white on the other side. Likewise, the two sides of the problem plates can be arranged in different colors, for instance, white on one side and green on the other side.

Suitably, the numbers of the answer plate of an arithmetical playing game can be arranged in numerical order. No number appears double on the plate.

With these and other objects in view, which will become apparent in the following detailed description, the present invention will be clearly understood in connection with the accompanying drawings, in which:

FIGURE 1 is a center section through an answer plate;

FIG. 2 is a top plan view thereof seen from the right;

FIG. 3 is a bottom plan view thereof, seen from the left;

FIG. 4 is a section along the lines 4—4 of FIG. 2;

FIG. 5 is a top plan view of an answer plate, partly broken away;

FIG. 6 is a top plan view of an answer plate in accordance with FIG. 5, however, with all correctly set problem plates;

FIG. 7 is a perspective top view of one embodiment of the game;

FIG. 8 is a front elevation of a problem plate with set off cover plates;

FIG. 9 is a top plan view of a problem plate with set off cover plates;

FIG. 10 is a side elevation of a problem plate with set off cover plates;

FIG. 11 is a section along the lines 11—11 of FIG. 8;

FIG. 12 is a top plan view of the front side of three joined problem plates with set off cover plates;

FIG. 13 is a side elevation of the arrangement shown in FIG. 12;

FIG. 14 is a top plan view of the back side of three joined problem plates with set off cover plates;

FIG. 15 is a top plan view of a problem plate formed as an exchange frame with plates;

FIG. 16 is a side view of the arrangement shown in FIG. 15;

FIG. 17 is a section along the lines 17—17 of FIG. 15;

FIG. 18 is a front elevation of a problem plate with non-set off cover plates;

FIG. 19 is a top plan view of the problem plate with non-set off cover plates;

FIG. 20 is a side view of a problem plate with non-set off cover plates;

FIG. 21 is a section along the lines 21—21 of FIG. 18;

FIG. 22 is a top plan view of the front side of three joined problem plates with non-set off cover plates;

FIG. 23 is an end view of the arrangement shown in FIG. 22; and

FIG. 24 is a top plan view of the back side of three joined problem plates with non-set off cover plates.

Referring now to the drawings, and in particular to FIGS 1–7, the question and answer game, designed in accordance with the present invention, comprises an answer plate 2, which is equipped with a plurality of fields 1 having writings on both sides thereof, and which is further equipped on both sides with a peripheral frame 3. Question or problem plates 4 corresponding to the fields 1 and to be deposited thereon are equipped with writing on both sides, for instance, with questioning problems, and which are also equipped on the two longitudinal sides with tooth-like profiles, whereby one question plate 4 is equipped with two different, yet only immaterially distinguishable profiles 5 and 5a and two straight sides 6, which are disposed parallel relative to each other, and only the profile and complementary or counterprofile of two question plates 4, engaging each other at their longitudinal sides upon providing the correct solution, fit together. The frame 3 is, thereby, designed as to its length so close, that the question plates 4 only fit between the limits of the frame 3, if the question plates 4 have been correctly deposited. In order to prevent that a student already upon setting of the last question plate 4 can recognize by the form of the profile, at which place the question plate 4 belongs, always a profile line is covered up by a rectangular cover plate, which has straight edges and which can overlap slightly over the profile line. The cover plates 7 and 7a (FIGS. 8 to 11) are, for instance, set off on the upper and lower side of the question plate 4. Thus, on the upper side, the rear profile can be covered up, while on the lower side the front profile is covered up (FIG. 10). It is also possible, however, to cover up one of the two profiles on the upper, as well as on the lower side by rectangular covering plates 8 and 8a with straight edges (FIG. 18), while the other profile of the question plate 4 is visible on both sides. In order to permit an easier sliding of the question plates 4 below the covering plate of the neighboring plate, the profiles have inclinations 9 on the non-covering sides (FIG. 20). For a simpler exchange of the writing of the question plates 4, the latter can be formed by an exchange frame 10 open on both sides (FIGS. 15 to 17), which exchange frame 10 has on the two longitudinal sides slightly inclined tooth-shaped profiles 5 and 5a, as well as rectangular cover plates 7' and 7a' with straight edges and a window and which comprise also a plate 11 which are slidable into the frame 10 (FIG. 17).

The application and operation of the present question and answer game is as follows:

The operation is done in such manner, that the question plates 4 are joined, for instance, in an arithmetic order, to a mosaic on the answer plate 2. At the start of the game, the question plates 4 are disposed completely out of order on a table (FIG. 7). The plates, which can be, for instance, green, that is, they are green on the upper side, belong to the white answer side, for instance, and the white plates, for instance, that means, having a white top face, belong to the green answer side, for instance. The student grips now any one of the question plates 4, determines the problem written thereon, for instance, 33—4, and calculates: 33—4=29. Then, the child looks for the number 29 on the answer table 2 and covers this number with the question plate 4. Thus, the student puts succesively all question plates 4 onto the answer table 2, and in particular to the number arrived at by solving the problem. The further this game progresses, so much more join the question plates 4 to a "toothed unit."

Only if all tooth-shaped edges interengage each other, have all questions been answered correctly. The student is forced to exercise his mental faculty, for instance, to calculate. Each question plate 4 forms a toothed engagement toward two opposite sides with two adjacent plates. The right position of each question plate set on the answer board is five times secured, and in particular, first by engaging the tooth of the upper edge of the question plate 4 with the lower tooth row of the upper adjacent plate, second, in such manner, that the teeth of the lower edge of the question plate must engage the upper tooth row of the lower engaging plate. Furthermore, the upper joint must be arranged then at the upper edge of the cover plate. Also, the lower joint at the lower edge of the cover plates must likewise be disposed hair thin. Finally, the fifth security for the correct deposition or laying of the question plates onto the answer board is achieved in such manner, that ten question plates of one column fit only then into the frame, if all ten question plates have been deposited correctly, since the frame receives without play all question plates, after all question plates have been deposited correctly.

As soon as the first mosaic side has been joined, the question plates are tipped out, are mixed up relative to each other, the answer plate is turned over such, that now its green side points upwardly and one begins, for instance, calculating to set up the question plates with the white side upwards onto the green answer side. If this mosaic is properly fitted by, for instance, fifty questions, then the student has solved 100 problems without necessity that the teacher asks a single question.

The mental faculties are exercised, for instance by calculation, without the necessity of writing. The number of the problems or questions is so great, that the learning by heart of the results is impossible. The differently written plates, which individually have their predetermined number, are successively exchanged among the students. Each question plate carries also the number of the corresponding table in order to permit an easier sorting in case of a mix-up of the plates.

Summarizing, it can be stated that the question and answer game, designed in accordance with the present invention, serves not only the repeated exercise in certain predetermined proficiencies and techniques, for instance, calculation by head, as well as the repetition of the knowledge in different fields, as history, geography, grammar, and others. By the game, designed in accordance with the present invention, the exercise and repeating material is not taken care of in the conventional questioning method, rather, is performed and solidified by the own operation of the student manually playing.

The question and answer game can thus in a mosaic manner be applied in most different fields, for instance, in calculation, practice of historic dates, exercise of the declination of a noun and practice in geographical fields.

The technical progress of the present invention resides in the fact that the teacher is greatly discharged in his work in the repeating exercises, since he has not to raise any questions. Furthermore, he is relieved from the duty of time consuming control of the answers. The entire class can work in silent work during a time period in which a mathematical mosaic has been solved correctly on both sides, by for instance, ten students with thousand correct answers. It must be added, that each student must solve each problem on his own. Cheating or the like is not possible. The student cannot escape any questions. Rather, only after solution of the problem can he set the question plates on the answer plate. The exercise repeated in a certain time interval and the competition in the manual play ("Who has finished the mosaic the fastest") increases the command of the technique, for instance, the head calculation. Furthermore, the material knowledge in fields as history, geography, grammar and others, is solidified.

A student will play and will be busy. He plays and learns by playing. Even at home, the student can on his own do his exercises and no control of the correctness of the solution is required. The unavoidable grind and repetition in the individual fields becomes a play by the mosaic game. The game in accordance with the present invention also complies with the different aptitudes or abilities. Even the slowly thinking student gets ahead by the working with the present invention. The game leads a class to working discipline and working methods.

Due to the volume of material in the teaching plans of today, the practice of certain accomplishments, for instance, head calculation, falls always short.

In summary, it can thus be stated that the advantage over the known working means for the silent occupation and the repeated practice by the students in school and at home resides in the fact that a double effect is brought about, since the individual question tables carry a problem on the upper side and on the lower side. By such arrangement, a saving on manufacturing material to about one half is achieved. Furthermore, a particular step for the control at the end of the exercises is no more necessary. Due to the insertion of the last question plates into the mosaic, simultaneously the control for the correctness of all solutions is given. This amounts to a working saving not to be underestimated for the teacher, as well as for the student.

When the problems or questions are exchangeable, new plates 11 are inserted into the exchange frame 20 (FIGS. 15 to 17). It is, however, only necessary to insert a thin insert which is written on on both sides with answers.

The technical progress of the question and answer game designed in accordance with the present invention, compared with known embodiments resides on one hand in the great saving of material, which is of importance in a mass production for students, and on the other hand, in the simple use in the problems and the solution of the problems. Finally, the control is appreciably simplified. The material required resides in an answer table and in a set of question plates for each answer table. The use is very simple, since upon taking a question plate and reading of the problem, the problem can be solved. Then the answer is looked for on the answer table and the question plate is mounted on the corresponding field on the answer table. A particular measure for the control is not necessary. As soon as the last question plate is to be inserted into the mosaic, all questions have been correctly answered. First of all it is of importance that only one of the corresponding profiles is visible. Accordingly, the student cannot recognize which of the question plates 4 complement each other.

While I have disclosed several embodiments of the present invention, it is to be understood that these embodiments are given by example only and not in a limiting sense, the scope of the present invention being determined by the objects and the claims.

I claim:
1. A question and answer game for the school and for the house comprising
   a base divided into a plurality of marked fields,
   a plurality of plates coordinated to said fields and to be positioned on the latter,
   said plates forming jointly a complete unit upon correct solution of problems provided on said plates,
   each of said plates having individual toothed profiles different from those of said other plates but only insignificantly distinguishable,
   a profile of one of said plates complementing a corresponding engaging profile of the adjacent plate,
   each of said plates being adapted to be used on both sides and having writings on the opposite sides thereof,
   each of said plates has four sides,
   two of said sides being disposed parallel relative to each other, and
   two of said sides forming different curves, to constitute curved sides,
   said curved sides having a tooth-shaped profile including a plurality of teeth,
   the number of said teeth in a teeth row being constant for each of the sides,
   the first and the last of the teeth of each teeth row being identical,
   the intermediate teeth of each of said plates are different from each other, and
   the teeth of one of said plates complementing the teeth of the adjacent plate bearing the correct solution of the problem provided on said adjacent plate.
2. The game, as set forth in claim 1, wherein
   said curved sides comprise different, but similar curves, and form waves, and
   said waves have wave heights and wave lengths which differ insignificantly from each other.
3. The game, as set forth in claim 1, wherein
the longitudinal sides of each of said plates has at least eight teeth.
4. The game, as set forth in claim 3, which includes
   a cover plate disposed on each side of said plates, each of said cover plates covering the toothed profile of one longitudinal side of said plates, and
   said toothed profile not covered by said cover plate on the other longitudinal side of said plate has an inclination.
5. The game, as set forth in claim 4, wherein
   said cover plate on one side of said plates is set off relative to said cover plate on the other side of said plates.
6. The game, as set forth in claim 4, wherein
   said cover plate on one side of said plates is disposed exactly opposite of said cover plate on the other side of said plate.
7. The game, as set forth in claim 1, wherein
   each of said plates comprises a change frame open at its top and at its bottom,
   said change frame has said toothed profiles on both longitudinal sides thereof,
   means making visible one of said profiles only, and
   an insert slidable into said change frame and adapted to receive writings on both sides thereof.
8. The game, as set forth in claim 1, wherein
   said base constitutes an answer table and has writings on both opposite sides.
9. The game, as set forth in claim 8, which includes
   a frame surrounding said base and disposed on each side of said base.
10. The game, as set forth in claim 1, which includes
    means making visible said profiles on at least one side only.

References Cited by the Examiner
UNITED STATES PATENTS

| | | | |
|---|---|---|---|
| 2,714,261 | 8/55 | Hight | 35—31 |
| 2,871,581 | 2/59 | Guzak | 35—31.4 |
| 2,875,531 | 3/59 | Mansfield | 35—73 X |
| 2,899,756 | 8/59 | Wise | 35—31.6 |
| 2,923,551 | 2/60 | Pope | 273—157 |

EUGENE R. CAPOZIO, *Primary Examiner.*
LAWRENCE CHARLES, *Examiner.*